UNITED STATES PATENT OFFICE.

FRANK COOK, OF COUNCIL BLUFFS, IOWA.

COATING COMPOSITION.

1,394,280.  Specification of Letters Patent.  Patented Oct. 18, 1921.

No Drawing.  Application filed July 9, 1920. Serial No. 395,100.

*To all whom it may concern:*

Be it known that I, FRANK COOK, a citizen of the United States, residing at Council Bluffs, in the county of Pottawattamie and State of Iowa, have invented new and useful Improvements in Coating Composition, of which the following is a specification.

The object of my present invention is the provision of a coating composition of calcimine character and possessed of glaze quality.

To the attainment of the foregoing the composition consists of a mixture of starch preferably corn starch, glycerin, water and coloring matter, preferably distemper color *i. e.*, a color ground in water as distinguished from coloring matter for coloring calcimine.

In preparing the composition I prefer to use the ingredients in about the proportions—viz; one pound of starch, eight ounces of glycerin, and one pint of luke warm water. I thoroughly dissolve the starch in the liquid mixture and bring the whole to a boiling point by adding boiling water to the mixture. The mixture is then thinned with cold water and color added according to the color effect that it is desired to produce. The quantity of cold water so added is determined by the character of the surface over which the composition or calcimine is applied. This will be better understood when it is stated that it is desirable to coat rough plaster with a thicker glaze-like composition than a trowel finish or a painted wall.

Prior to use the composition is permitted to cool and is then strained to free it of lumps.

I would also have it understood that the surface to be coated also determines the mode of procedure in the application of the composition. For instance on large walls or walls of which there is considerable suction or over wall paper the calcimine or watercolor paint should be applied to a space of such area as will not dry before the operator can return to such area and stipple the caclimine or water color paint directly to the wall. The best time for carrying out this supplemental application is when the calcimine or water color paint is drying but not entirely dry. This method is not necessary on surfaces having no appreciable amount of suction unless the surfaces are of large area.

It will be appreciated from the foregoing that my composition in effect is a coating composition to be applied over any water color paint or calcimine to provide stipple or blended effect instead of the ordinary plain wall. In this connection it will be understood that it is first necessary to have a coat of water color mentioned or calcimine on the wall before my novel composition is applied and subsequently to the application my composition because of its transparent quality shows the undercoat in places where my composition is thinnest, and shows its own color or colors where it is thickest, with the result that the wall is provided with two or three colors.

It will further be appreciated that my novel composition applied as stated produces the same effect on walls that can be produced at present only by expensive coatings over flat oil paints.

In marketing my improvement I prefer to place the mixture of starch and glycerin in cans, and to market the colors in separate receptacles or in separate compartments of the same receptacle. From this it follows that the user of the composition will have the option of any shade of color that he desires.

Having described my invention, what I claim and desire to secure by Letters-Patent, is:—

1. A coating composition adapted to be applied over water color paint or calcimine and consisting of starch, glycerin, water and coloring material.

2. A coating composition adapted to be applied over water color paint or calcimine and consisting of starch, glycerin, water and distemper coloring matter.

3. A coating composition adapted to be applied over water color paint or calcimine and consisting of one pound of starch, eight ounces of glycerin, distemper coloring matter, and sufficient water to thoroughly dissolve the starch; the said ingredients being boiled, and being adapted to be thinned by the addition of cold water.

In testimony whereof I affix my signature.

FRANK COOK.